United States Patent [19]

Hashizume et al.

[11] Patent Number: 6,092,901
[45] Date of Patent: Jul. 25, 2000

[54] POLARIZING ILLUMINATION DEVICE AND PROJECTION DISPLAY DEVICE

[75] Inventors: Toshiaki Hashizume, Okaya; Tomiyoshi Ushiyama, Minowa-machi; Hisashi Iechika, Shoziri, all of Japan

[73] Assignee: Seiko Epson Corporation, Tokyo, Japan

[21] Appl. No.: 09/203,343

[22] Filed: Dec. 2, 1998

[30] Foreign Application Priority Data

Dec. 17, 1997 [JP] Japan .................................... 9-364500

[51] Int. Cl.[7] .................................. F21V 9/14; G02B 5/30
[52] U.S. Cl. ........................... 362/19; 362/331; 362/268; 362/293; 353/31; 353/46; 353/20; 359/487; 359/483; 349/66; 349/95
[58] Field of Search ............................. 362/19, 331, 268, 362/293; 353/31, 46, 20; 359/487, 483; 349/66, 95

[56] References Cited

U.S. PATENT DOCUMENTS 5,452,128   9/1995   Kimura ..................................... 359/487
5,748,369   5/1998   Yokota ..................................... 359/487

FOREIGN PATENT DOCUMENTS 7-294906   11/1995   Japan .

Primary Examiner—Sandra O'Shea
Assistant Examiner—Ronald E. DelGizzi
Attorney, Agent, or Firm—Oliff & Berridge, PLC

[57] ABSTRACT

A polarizing illumination device and a projection display device using the polarizing illumination device improve light utilization efficiency. Polarizing conversion elements are placed so that one of polarizing separation films of a first polarizing conversion element and one of polarizing separation films of a second polarizing conversion element are close to each other and so that effective incident areas and ineffective incident areas are alternately arranged in the x direction. The width WP in the x direction of the effective incident areas and the ineffective incident areas is set to be larger than half of the width WL in the x direction of small lenses in a second lens array. The optical axes of each of small lenses are offset from the lens centers thereof so that partial beams emerging from the small lenses in a first lens array optimally enter the effective incident areas where the partial beams should enter.

16 Claims, 8 Drawing Sheets

POLARIZING ILLUMINATION DEVICE AND PROJECTION DISPLAY DEVICE

BACKGROUND OF THE INVENTION

1. Field of Invention

The present invention relates to a polarizing illumination device in which illumination light is polarized in a predetermined polarization direction, and to a projection display device provided with such a polarizing illumination device.

2. Description of Related Art

In order to obtain a bright display by improving light utilization efficiency, a projection display device employs an illumination device that converts light polarized in random directions (unpolarized light) into light polarized in one direction, and then uses the converted light. An example of using such a device for converting light polarized in random directions into light polarized in one direction is disclosed in Japanese Unexamined Patent Publication No. 7-294906. FIG. 8 is a plan view of an optical element for use in converting light polarized in random directions into light polarized in one direction. This optical element includes a polarizing beam splitter array 20 in which polarizing beam splitters 30 having polarization separating films 36 and prisms 40 having reflecting films 46 which are alternately bonded. The light incident surface of the polarizing beam splitter array 20 has a lens array 10 composed of a plurality of condenser lenses 11. On parts of the light emergent surface thereof, $\lambda/2$ phase plates 24 are selectively formed.

As shown in FIG. 8(A), light beams that are incident on the lens array 10 are split into a plurality of partial beams (intermediate beams) and are collected by the plurality of condenser lenses 11 constituting the lens array 10, and enter, as incident light including an s-polarized light component and a p-polarized light component, the polarizing beam splitters 30 that are located corresponding to the lens array 10. This incident light is first separated into s-polarized light and p-polarized light by the polarization separating film 36. The s-polarized light is almost perpendicularly reflected by the polarization separating film 36 that forms an angle of 45° with the light incident surface, further perpendicularly reflected by the reflecting film 46 that forms an angle of 45° with the light incident surface, and emerges from the prism 40. On the other hand, the p-polarized light passes unchanged through the polarization separating film 36, is converted into s-polarized light by the $\lambda/2$ phase plate 24, and is then emitted. Therefore, this optical element is a polarizing conversion element that converts most incident light beams polarized in random directions into s-polarized light and emits the converted light.

Ideally, all light beams that are incident on the lens array 10 should be collected by each of the condenser lenses 11 constituting the lens array 10, and should enter the polarizing beam splitters 30 corresponding to each of the condenser lenses 11. Light beams that are incident on the actual lens array 10, however, are not entirely collected, and some of the light beams enter the prisms 40, as shown in FIG. 8(B). This is because the size of light-source images (focal images) formed near the polarization separating films 36 is equivalent to the width of the polarization separating films 36, and because it is difficult to form light-source images that are sufficiently smaller than the width of the polarization separating films 36.

Such a light beam that is incident on the prism 40 is totally reflected by the reflecting film 46, and enters the polarizing beam splitter 30 disposed adjacent to the prism 40. The light beam that is incident on the polarizing beam splitter 30 is separated into s-polarized light and p-polarized light by the polarization separating film 36. The separated s-polarized light is reflected by the polarization separating film 36, is converted into p-polarized light by the $\lambda/2$ phase plate 24, and is then emitted. The p-polarized light passes through the polarization separating film 36, is reflected by the reflecting film 46 in the prism 40 disposed in the direction of transmission, and is then emitted. Therefore, the light beam that is incident on this optical element is emitted after it is not converted into a single light beam of s-polarized light, but into a light beam including a p-polarized light beam as well. The incident area of the polarizing conversion element is divided into effective incident areas EA and ineffective incident areas UA. The effective incident area EA means an incident area of the polarizing conversion element where an incident light beam is converted into desired polarized light and is emitted. The ineffective incident area UA means an incident area of the polarizing conversion element where an incident light beam is converted into undesirable polarized light and is emitted. Therefore, in this related art, the incident surfaces of the plural polarizing beam splitters 30 serve as the effective incident areas EA, and the incident surfaces of the plural prisms 40 serve as the ineffective incident areas UA.

When it is desired that only one type of polarized light be used, light which would enter such ineffective incident areas UA must be blocked by a polarizer or the like. That is, since the aforesaid p-polarized emergent light is not used in such a case, the light utilization efficiency deteriorates. In particular, a light source for use in an illumination device of a projection display device (a light source for emitting nearly-parallel light by using an electric-discharge lamp such as a metal halide lamp as a light-source lamp) provides a low light collecting ability near the optical axis thereof because the parallelism of light is low near the optical axis thereof, and it is difficult to reduce the size of light-source images near the polarization separating films 36. For this reason, there is a tendency for many light beams to enter the prisms 40. Moreover, since the light intensity is higher near the optical axis of the light source, the light utilization efficiency substantially decreases near the optical axis of the light source.

SUMMARY OF THE INVENTION

The present invention has been made to solve the aforesaid problems in the related art, and has an object of the provision of a technique for improving the light utilization efficiency in a polarizing illumination device and a projection display device using the polarizing illumination device.

In order to solve the aforesaid problems, a first polarizing illumination device of the present invention includes:

a light source;

a lens array having a plurality of small lenses arranged in a matrix along a first direction and along a second direction perpendicular to the first direction, the lens array separating light emitted from the light source into a plurality of partial beams; and a polarizing conversion element including a polarizing beam splitter array that separates each of the plurality of partial light beams that have passed through the lens array into light components having first and second polarization directions, the polarizing beam splitter array separating the partial beams with a plurality of pairs of polarizing beam separation surfaces and reflecting surfaces, said reflecting surfaces being in parallel with the polarizing beam separation surfaces, said reflecting surfaces reflecting one of the light components having first and second polarization directions separated by the polarizing beam separation surfaces, the plurality of the polarizing beam separation surfaces and the reflecting surfaces being arranged along at least the first direction, and a phase plate that aligns the polarization directions of the light components emerging from the polarizing beam splitter array into one of the first and second polarization directions, optical centers of the plurality of small lenses in the lens array being offset from a geometric center of said small lenses so that the plurality of partial beams for at least one line arranged in the first direction enter desired areas of the polarization beam separation surfaces.

In the first polarizing illumination device, partial beams emerging from a plurality of small lenses in the lens array are adjusted so as to efficiently enter the polarizing beam separation surfaces where they should enter. Therefore, according to the first polarizing illumination device of the present invention, it is possible to improve the light utilization efficiency.

A second polarizing illumination device of the present invention includes:

a light source;

a lens array having a plurality of small lenses arranged in a matrix along a first direction and along a second direction perpendicular to the first direction, the lens array separating light emitted from the light source into a plurality of partial beams; and first and second polarizing conversion elements each including a polarizing beam splitter array that separates each of the plurality of partial beams passed through the lens array into light components having first and second polarization directions, the polarizing beam splitter array separating the partial beams with a plurality of pairs of polarizing beam separation surfaces and reflecting surfaces, said reflecting surfaces being in parallel with the polarizing beam separation surfaces, said reflecting surfaces reflecting one of the linearly polarized lights having first and second polarization directions separated by the polarizing beam separation surfaces, the plurality of pairs of the polarizing beam separation surfaces and the reflecting surfaces being arranged along at least the first direction, and a phase plate that aligns the polarization directions of the light components emerging from the polarizing beam splitter array into one of the first and second polarization directions, the first and second polarization conversion elements being placed so that one of the polarizing beam separation surfaces of the first polarizing conversion element and one of the polarizing beam separation surfaces of the second polarization conversion element being closely opposed to each other across a center optical axis of the light source, and optical centers of the plurality of small lenses in the lens array being offset so that the plurality of partial beams for at least one line arranged in the first direction enter the polarizing beam separation surfaces.

The second polarizing illumination device also provides similar operations and advantages to those of the first polarizing illumination device. Moreover, since the first and second polarizing conversion elements can be (symmetrically) placed so that the polarization separating films thereof are closely opposed to each other across the center optical axis of the light source, it is possible to more effectively utilize an area where the light intensity of the light source is the highest, compared with the first polarizing illumination device.

In the first and second polarizing illumination devices, it is preferable that the layout pitch WP of the polarizing beam separation surfaces and the reflecting surfaces along the first direction in the polarizing beam splitter array be set to be larger than WL/2 where WL represents the width in the first direction of the plurality of small lenses in the lens array.

In the first and second polarizing illumination devices, since the width WP along the first direction of the polarizing beam separation surfaces and the reflecting surfaces in the polarizing beam splitter array are larger than half of the width WL in the first direction of the small lenses in the lens array, it is possible to cause more light to enter the polarizing beam separation surfaces, compared with the case in which the width WP is equal to half of the width WL.

In the first and second polarizing illumination devices, it is preferable that the optical center of a first small lens of the small lenses, which is disposed close to the center optical axis of the light source, be positioned offset from the geometric center thereof toward the center optical axis of the light source. Regarding at least some small lenses adjoining along the first direction, it is preferable that the distance between the optical centers of two arbitrary small lenses be set to be larger than the pitch between the geometrical centers of the two small lenses.

When the lens array has the structure mentioned above, it is possible to efficiently cause a plurality of partial beams emerging from the lens array to enter the polarizing beam separation surfaces of the polarizing beam splitter array.

In the first and second polarizing illumination devices, at least some of the plurality of small lenses for emitting a plurality of partial beams for at least one line may be formed of decentering lenses.

A decentering lens is a lens whose optical center (lens optical axis) is offset from the geometric center (lens center). The use of this lens makes it possible to easily deflect the optical path of a light beam emerging from the lens. Moreover, the use of a decentering lens having a different amount of decentering makes it possible to easily alter the amount of deflection of the light beam emerging from the lens. Therefore, through the use of a decentering lens, easy adjustment can be made so that a partial beam emerging from this lens enters the polarizing beam separation surface where the partial beam should enter.

The invention may also include a first projection display device including:

the first or second polarizing illumination device;

a modulator or modulation means that modulates emergent light from the polarizing illumination device according to a given image signal; and a projector device or projection means that projects the light modulated by the modulator onto a projection plane.

Also, the invention may include a second projection display device including:

the first or second polarizing illumination device;

a colored-light separator or colored-light separation means that separates emergent light from the polarizing illumination device into lights of three colors;

three optical modulators or three optical modulation means that modulate the three colored lights according to a given image signal;

a colored-light synthesizer or colored-light synthesizing means that synthesizes the modulated three colored lights modulated by the three optical modulators, and emits the synthesized lights in the same direction; and a projection device or projection means that projects the lights synthesized by the colored-light synthesizers onto a projection plane.

The use of the first or second polarizing illumination device in the first or second projection display device improves the light utilization efficiency.

BRIEF DESCRIPTION OF THE DRAWINGS

FIG. 4 is an explanatory view showing the structure and function of a polarizing conversion element 140a.

DETAILED DESCRIPTION OF PREFERRED EMBODIMENTS

Next, modes for carrying out the present invention will be described with reference to embodiments. In the following description, unless otherwise specified, the direction of travel of light is taken as the z direction, the 3 o'clock direction viewed from the direction of travel of light (the z direction) is taken as the x direction, and the 12 o'clock direction is taken as the y direction.

Figure 1:
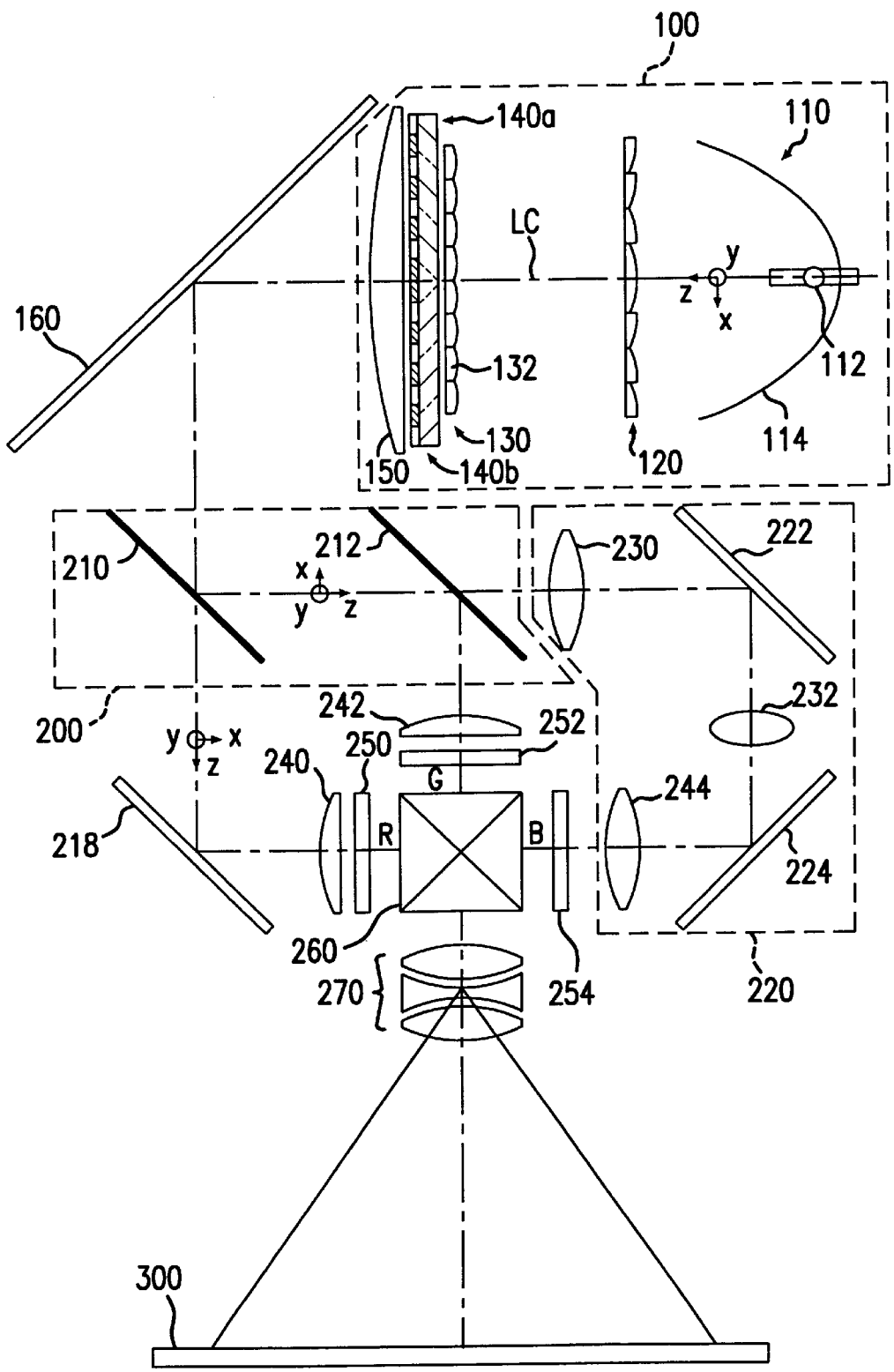
FIG. 1 is a schematic plan view showing the principal part of a projection display device according to a first embodiment.

FIG. 1 is a schematic plan view showing the principal part of a projection display device according to a first embodiment of the present invention. This projection display device comprises a polarizing illumination device 100, dichroic mirrors 210 and 212, reflecting mirrors 160, 218, 222, and 224, an incident-side lens 230, a relay lens 232, three field lenses 240, 242, and 244, three liquid crystal light valves (liquid crystal panels) 250, 252, and 254, a cross dichroic prism 260, and a projection lens system 270.

The polarizing illumination device 100 comprises a light source 110 for emitting an almost parallel light beam, a first lens array 120, a second lens array 130, polarizing conversion elements 140a and 140b, and a superimposing lens 150. This polarizing illumination device 100 is an integrator optical system for almost uniformly illuminating the three liquid crystal light valves 250, 252, and 254 serving as illumination areas.

The light source 110 includes a source lamp 112 serving as a radiation source for emitting radial beams, and a concave mirror 114 for emitting the radial beams emitted from the source lamp 112 as almost parallel light beams. It is preferable that a parabolic mirror be used as the concave mirror 114.

The first lens array 120 has the functions of splitting light emitted from the light source 110 into a plurality of partial light beams, and of collecting each of the partial beams near the second lens array 130. The second lens array 130 has the function of irradiating the partial beams emerging from the first lens array 120 onto the three liquid crystal light valves 250, 252, and 254 serving as illumination areas. The polarizing conversion elements 140a and 140b have the function of converting an incident light beam (a light beam including randomly polarized light) into predetermined linearly polarized light. The superimposing lens 150 has the function of superimposing a plurality of partial beams emerging from the polarizing conversion elements 140a and 140b on the liquid crystal light valves 250, 252, and 254 serving as illumination areas. The field lenses 240, 242, and 244 have the function of converting the partial beams to be irradiated onto the illumination areas into light beams each of which is parallel to the center axis thereof.

Figure 2:
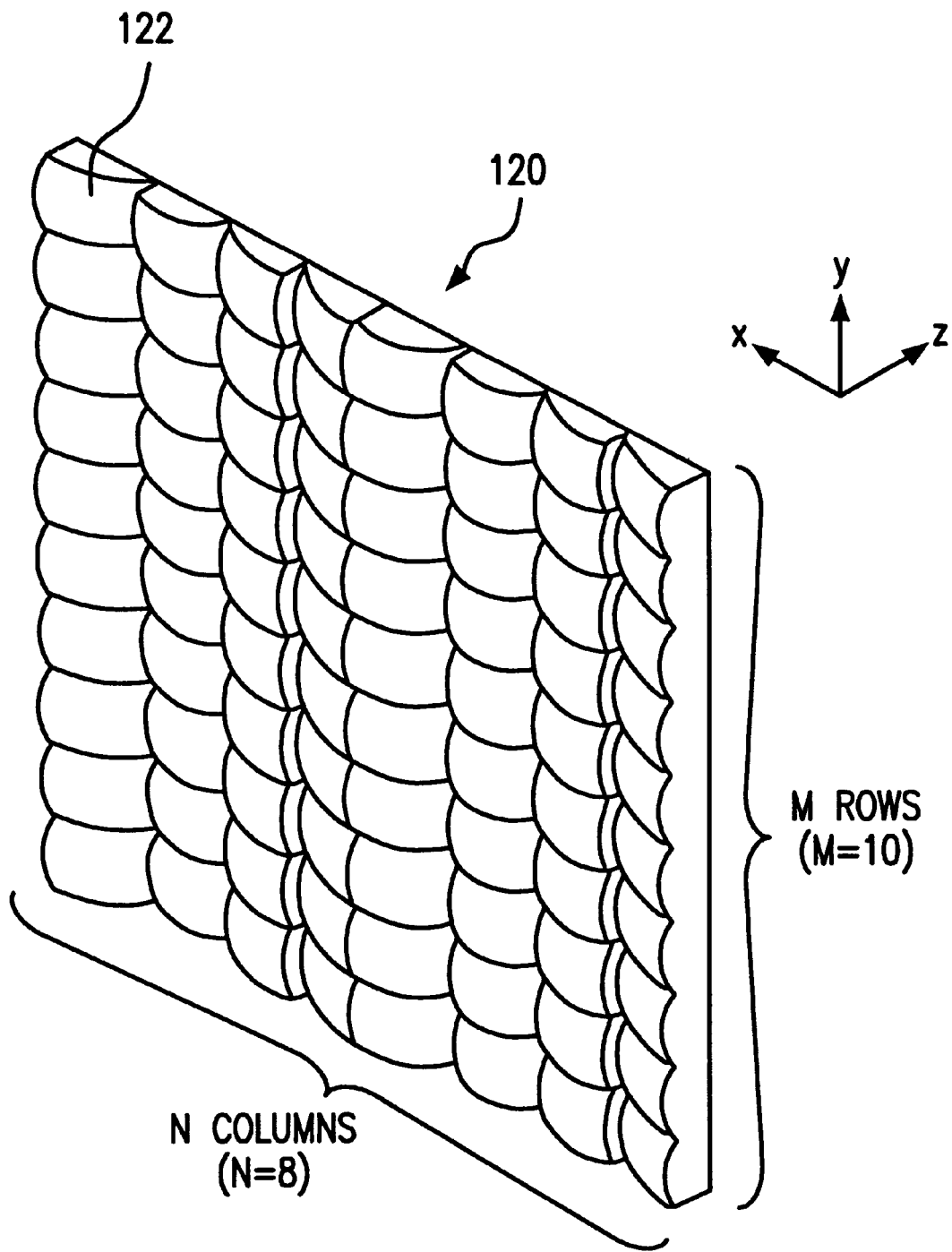
FIG. 2 is a perspective view showing the outward appearance of a first lens array 120.

FIG. 2 is a perspective view showing the outward appearance of the first lens array 120. The first lens array 120 is composed of small lenses 122, each having an almost rectangular outline, arranged in a matrix with M rows and N columns. In this embodiment, M is 10 and N is 8, although different numbers of small lenses may be used. The position of the optical center (optical axis) of each of the small lenses is offset from the geometrical center (lens center) in accordance with the layout positions of each of the small lens. This will be described later.

Figure 3:
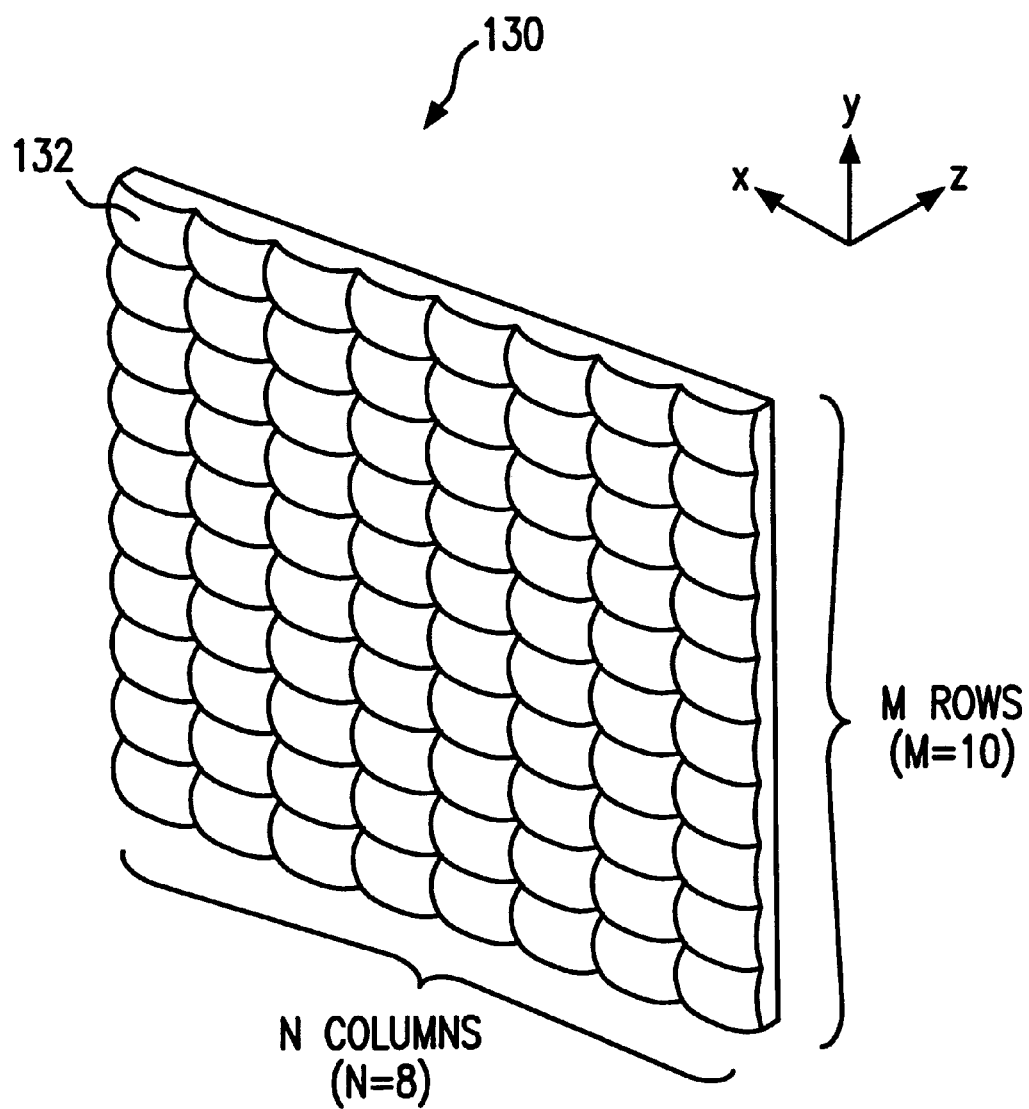
FIG. 3 is a perspective view showing the outward appearance of a second lens array 130.

FIG. 3 is a perspective view showing the outward appearance of the second lens array 130. Similarly to the first lens array 120, the second lens array 130 is composed of a plurality of small lenses 132 arranged in a matrix with M rows and N columns. The positions of the optical axes of the small lenses in the second lens array 130 align with the lens centers thereof. In a similar manner to the first lens array 120, however, the positions may be offset from the lens centers according to the layout positions of each of the small lenses. The first and second lens arrays 120 and 130 are arranged so that the center positions thereof align with the position of a system optical axis LC.

Each of the small lenses in the first lens array 120 splits a light beam emitted from the light source 110 (FIG. 1) into a plurality of (i.e., M by N) partial beams, and collects the partial beams near the second lens array 130. The outer shape of each of the small lenses in the first lens array 120, viewed from the z direction, is set almost similar to the shape of display areas of the liquid crystal light valves 250, 252, and 254. For example, when the aspect ratio (the length-to-width ratio) of the image display area is 4:3, the aspect ratio of the small lenses 122 in the first lens array 120 is also set at 4:3.

Figure 4A:
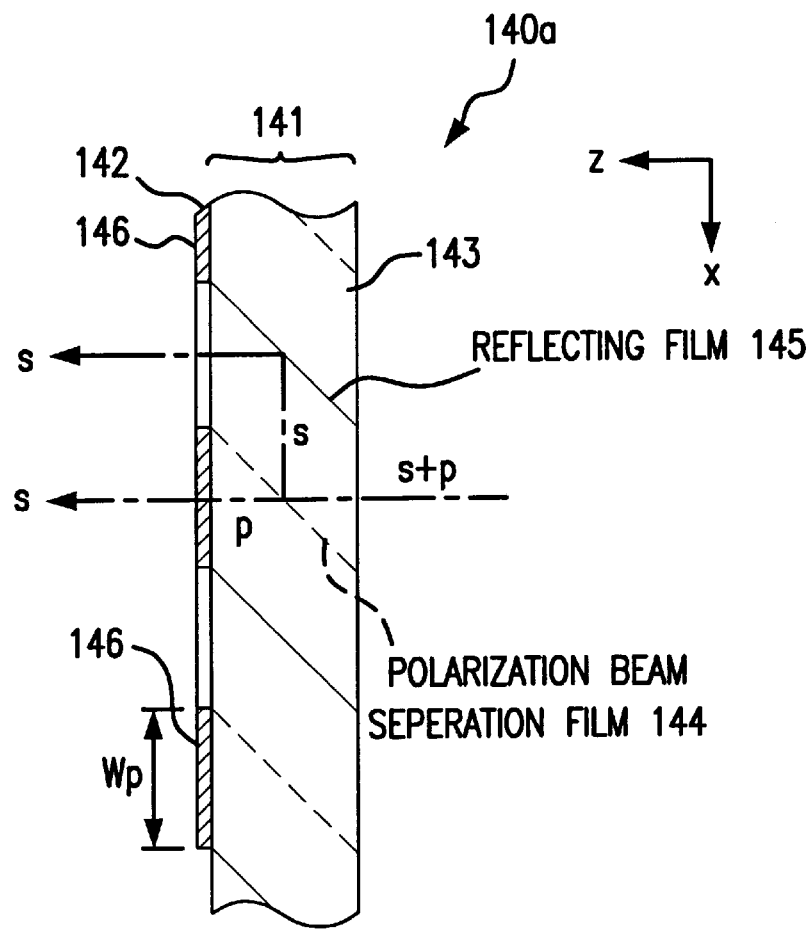
Figure 4B:
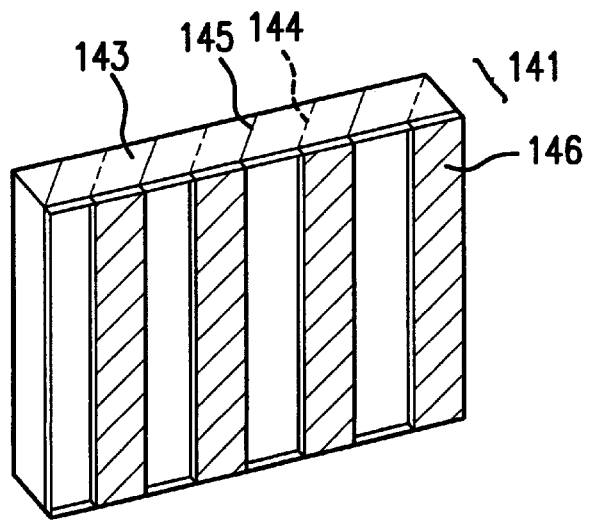

FIG. 4 is an explanatory view showing the structure and function of the first polarizing conversion element 140a (FIG. 1). The polarizing conversion element 140a includes a polarizing beam splitter array 141, and a selective phase plate 142. The polarizing beam splitter array 141 is shaped such that a plurality of prismatic light-transmissive plates 143 with a parallelogrammatic cross section are alternately bonded. At the interface surfaces between the light-transmissive plates 143, polarization separating films 144 and reflecting films 145 are alternately formed. The polarizing beam splitter array 141 is made by bonding a plurality of glass plates, which are provided with the polarization separating films 144 and the reflecting films 145, so that the polarization separating films 144 and the reflecting films 145 are alternately arranged, with the glass plates cut diagonally at a predetermined angle.

Light passing through the first and second lens arrays 120 and 130 is separated into s-polarized light and p-polarized light by the polarization separating film 144. The p-polarized light passes unchanged through the polarization separating film 144. On the other hand, the s-polarized light is reflected by the polarization separating film 144, further reflected by the reflecting film 145, and then emitted almost parallel to the p-polarized light that passes unchanged through the polarization separating film 144. The surface portions of the selective phase plate 142, where the light passing through the polarization separating films 144 emerges, are provided with λ/2 phase layers 146, and the surface portions where the light reflected by the reflecting films 145 emerges are not provided with λ/2 phase layers 146. Therefore, the p-polarized light passing through the polarization separating film 144 is converted into s-polarized light by the λ/2 phase layer 146 and emitted. As a result, most light beams incident on the polarizing conversion element 140, which are polarized in random directions, are converted into s-polarized light and emitted. Of course, the light beams may be converted into p-polarized beams and emitted by forming the λ/2 phase layers 146 of the selective phase plate 142 only on the surface portions where the light reflected by the reflecting films 145 emerges.

The second polarizing conversion element 140b has almost the same structure as the first polarizing conversion element 140a, and is different in the direction of arrangement of the films. In the first polarizing conversion element 140a, the polarization separating films 144 and the reflecting films 145 are alternately arranged in the x direction on the left side viewed from the direction of travel of light. On the other hand, in the second polarizing conversion element 140b, the polarization separating films 144 and the reflecting films 145 are alternately arranged in the x direction on the right side viewed from the direction of travel of light. That is, the polarization separating films 144 of the first polarizing conversion element 140a and the polarization separating films 144 of the second polarizing conversion element 140b are arranged across the yz plane including the system optical axis LC so as to point in opposite directions.

In the projection display device shown in FIG. 1, an almost parallel light beam emitted from the light source 110 is split into a plurality of partial beams by the first and second lens arrays 120 and 130 that constitute the integrator optical system. The partial beams emerging from each of the small lenses in the first lens array 120 are collected so that light-source images (secondary light-source images) of the light source 110 are formed near the polarization separating films 144 of the polarizing conversion elements 140a and 140b. As mentioned above, the partial beams that are incident on the polarizing conversion elements 140a and 140b are separated into two polarized lights by the polarization separating films 144 and the reflecting films 145. Therefore, secondary light-source images are almost formed on the polarization separating films 144 in the polarizing conversion elements 140a and 140b. In terms of effectiveness, it can be assumed that the secondary light-source images are also formed on the reflecting films 145. In other words, secondary light-source images, which are twice as many as the partial beams passing through the first and second lens arrays 120 and 130, are formed at corresponding positions on the polarization separating films 144 and the reflecting films 145 in the polarizing conversion elements 140a and 140b.

The partial beams emerging from the secondary light-source images that are formed in the polarizing conversion elements 140a and 140b are superimposed by the superimposing lens 150 on the display areas of the liquid crystal light valves 250, 252, and 254 serving as illumination areas. While the reflecting mirror 160 has the function of reflecting the light beam emerging from the superimposing lens 150 toward the dichroic mirror 210, it is not always necessary, depending on the configuration of the device. As a result of the above, each of the liquid crystal light valves 250, 252, and 254 are almost uniformly illuminated.

The two dichroic mirrors 210 and 212 function as colored-light separation means for separating white light, which is collected by the superimposing lens 150, into colored lights of the three colors of red, green, and blue. The first dichroic mirror 210 transmits a red light component of the white light beam emerging from the polarizing illumination device 100, and reflects blue and green light components. The red light passing through the first dichroic mirror 210 is reflected by the reflecting mirror 218, passes through the field lens 240, and reaches the liquid crystal light valve for red light 250. This field lens 240 converts each of the partial beams emerging from the second lens array 130 into beams that are in parallel with the center axis thereof. This also applies to the field lenses 242 and 244 disposed before the other liquid crystal light valves. The green light of the blue and green lights, which are reflected by the first dichroic mirror 210, is reflected by the second dichroic mirror 212, and reaches the liquid crystal light valve for green light 252 via the field lens 242. On the other hand, the blue light passes through the second dichroic mirror 212, passes through a relay lens system including the incident-side lens 230, the relay lens 232, and the reflecting mirrors 222 and 224, further passes through the emergent-side lens (field lens)244, and reaches the liquid crystal light valve for blue light 254. The relay lens system is used for the blue light to prevent the light utilization efficiency from decreasing because the optical path of the blue light is longer than the optical paths of the other colored lights, namely, to transmit the partial beams, which are incident on the incident-side lens 230, unchanged to the emergent-side lens 244.

The three liquid crystal light valves 250, 252, and 254 function as optical modulation means for forming images by modulating three colored lights according to given image information (image signals). The cross dichroic prism 260 functions as a colored-light synthesizing means for forming a color image by synthesizing the three colored lights. In the cross dichroic prism 260, a dielectric multilayer film for reflecting red light and a dielectric multilayer film for reflecting blue light are formed in about the shape of an X along the interface surfaces between four rectangular prisms. The three colored lights are synthesized by these dielectric multilayer films, and synthesized light is formed to project a color image. The synthesized light produced by the cross dichroic prism 260 is emitted toward the projection lens system 270. The projection lens system 270 functions as a projection means for displaying a color image by projecting the synthesized light onto a projection screen 300.

The projection display device shown in FIG. 1 is characterized by the polarizing illumination device 100 including the first lens array 120, the second lens array 130, and the polarizing conversion elements 140a and 140b. As mentioned above, since the polarizing conversion elements 140a and 140b are placed so that the polarization separating films 144 thereof are closely arranged across the yz plane including the system optical axis LC to point in opposite directions, the optical system for a light beam passing through the polarizing conversion element 140a and the optical system for a light beam passing through the polarizing conversion element 140b have the same functions. Therefore, a description will be given below of the optical system for a light beam passing through the polarizing conversion element array 140a only.

Figure 5:
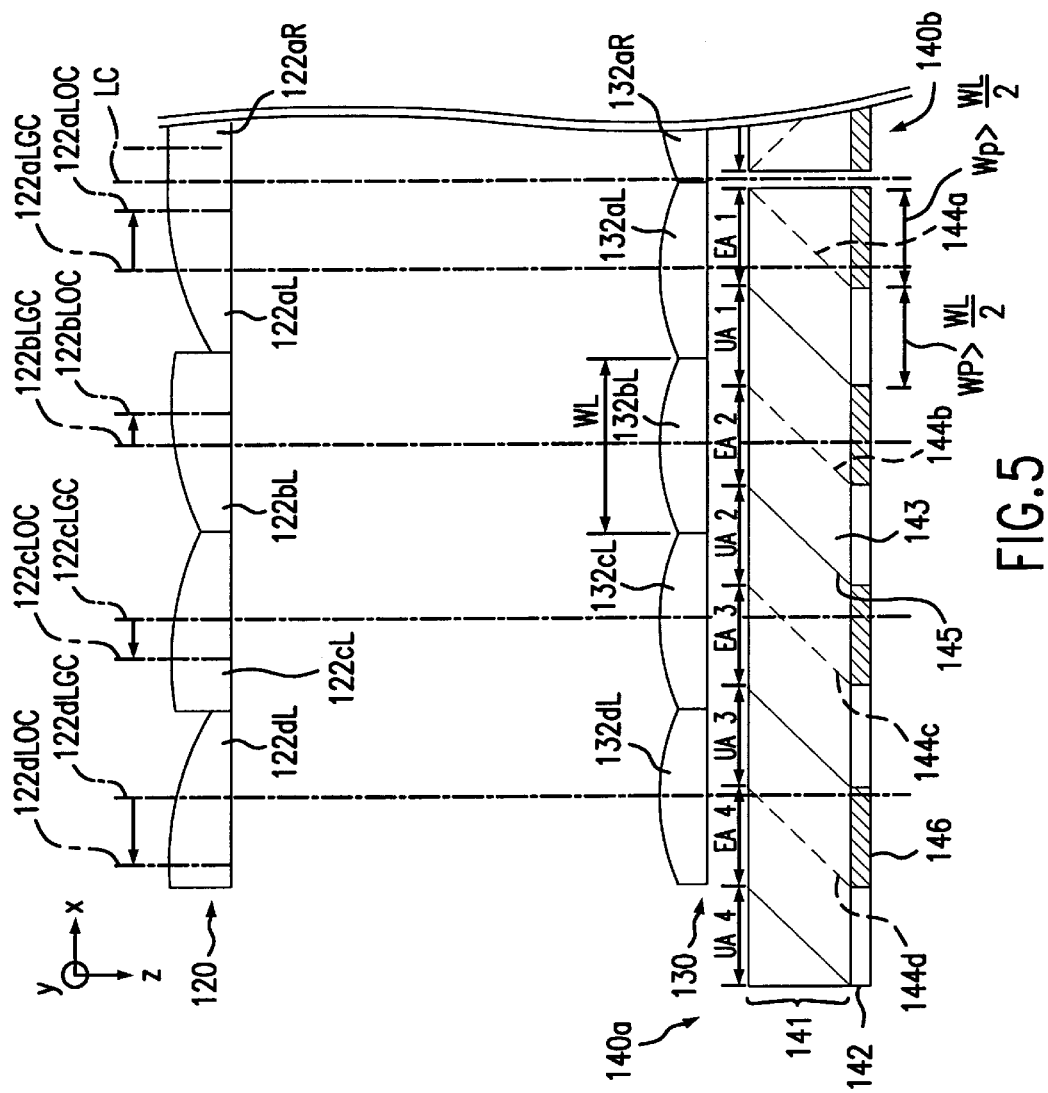
FIG. 5 is an enlarged explanatory view showing the polarizing conversion element 140a, the first lens array 120, and the second lens array 130 in a polarizing illumination device 100.

FIG. 5 is an enlarged explanatory view of the polarizing conversion element 140a, the first lens array 120, and the second lens array 130 in the polarizing illumination device 100. On the light incident surface (the surface in parallel with the xy plane) of the polarizing conversion element 140a, effective incident areas EA1–EA4 (the light incident surface portions corresponding to the polarization separating films 144) where light incident on the polarization separating films 144 to be converted into effective polarized light (s-polarized light in this embodiment) enters, and ineffective incident areas UA1–UA4 (the light incident surface portions corresponding to the reflecting films 145) where light incident on the reflecting films 145 to be converted into ineffective polarized light (p-polarized light in this embodiment) enters, are alternately arranged. The width Wp in the x direction of the effective incident areas EA (EA1 to EA4) and the ineffective incident areas UA (UA1 to UA4) (the width in the x direction of the polarization separation films 144 and the reflecting films 145) is set to be larger than half of the width WL in the x direction of the small lenses 132 (132aL to 132dL) in the second lens array 130. Preferably, this width Wp is set large enough to increase the amount of light incident on the light incident surface portions corresponding to the polarization separating surfaces 144a–144d. In particular, it is preferable that the width Wp be larger than the size of light-source images (focal images) that are formed near the light incident surface portions corresponding to the polarization separating surfaces 144a–144d by the light beams near the optical axis of the light source.

Each of small lenses 122aL to 122dL in the first lens array 120 and each of the corresponding small lenses 132aL to 132dL in the second lens array 130 are placed so that the lens centers thereof align with each other.

The layout pitch in the x direction of the polarization separating films 144 (144a to 144d) in the polarizing conversion element 140a is equal to the width WP in the x direction of the reflecting films 145 (145a to 145d). As mentioned above, this width Wp is larger than half of the width WL in the x direction of the small lenses 132 (132aL to 132dL) in the second lens array. Therefore, the positions of the incident surface portions of the polarization separating films 144a to 144d where each of the partial beams emerging from each of the small lenses 122aL to 122dL in the first lens array 120 should enter, namely, the positions of the effective incident areas EA1 to EA4, are offset in the x direction in regard to the positions of the lens centers 122aLGC to 122dLGC of each of the small lenses 122aL to 122dL. When it is assumed that each of the small lenses 122aL to 122dL in the first lens array 120 are formed of a concentric lens (a lens whose lens center and optical axis align with each other) similarly to the second lens array 130, the partial beams emerging from each of the small lenses cannot enter the optimum positions in the effective incident areas EA1 to EA4 where they should enter, which deteriorates the light conversion efficiency. Accordingly, in this embodiment, each of the small lenses 122aL to 122dL in the first lens array 120 are formed of decentering lenses having optical axes 122aLOC to 122dLOC that are positioned such that the partial beams emerging from each of the small lenses 122aL to 122dL enter the optimum positions in the effective incident areas EA1 to EA4 (the centers of the partial beams enter about the centers of the effective incident areas EA1 to EA4).

Figure 6:
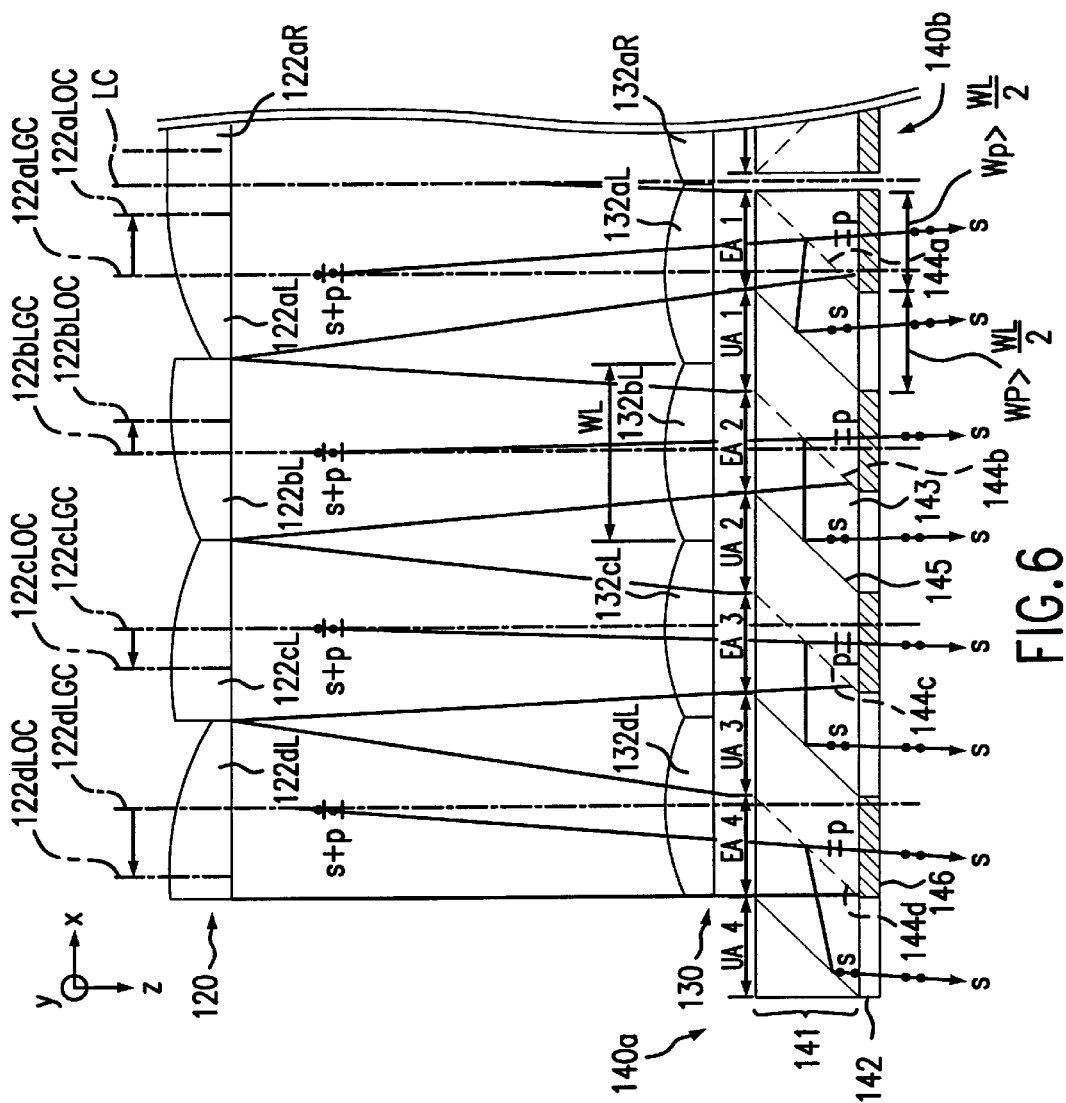
FIG. 6 is an explanatory view showing the structure shown in FIG. 4 on which principal waves ate drawn.

FIG. 6 shows principal rays illustrated on the configuration in FIG. 5. In the example shown in FIG. 6, the center of the effective incident area EA1 located near the system optical axis LC is offset from the lens center 122aLGC of the small lens 122aL toward the system optical axis LC. The optical axis 122aLOC of the small lens 122aL corresponding to the effective incident area EA1 is offset from the lens center 122aLGC toward the system optical axis LC so that the partial beam emerging from the small lens 122aL optimally enters the effective incident area EA1. Since the center of the second effective incident area EA2 is slightly offset from the lens center 122bLGC of the small lens 122bL toward the system optical axis LC, the optical axis 122bLOC of the small lens 122bL is slightly offset from the lens center 122bLGC toward the system optical axis. On the other hand, the center of the third effective incident area EA3 is slightly offset from the lens center 122cLGC of the small lens 122cL in the opposite direction from that towards the system optical axis LC. Therefore, the optical axis 122cLOC of the small lens 122cL corresponding to the effective incident area EA3 is slightly offset from the lens center 122cLGC in the opposite direction from that towards the system optical axis. Since the center of the fourth effective incident area EA4 is offset from the lens center 122dLGC of the small lens 122dL in the opposite direction from that towards the system optical axis LC, the optical axis 122dLOC of the small lens 122dL is offset from the lens center 122dLGC in the opposite direction from that towards the system optical axis. Such lenses having a center and an optical axis that are offset from each other can be realized by decentering lenses.

In this embodiment, the width WP in the x direction of the polarization separating films 144 in the polarization conversion elements 140a and 140b, namely, the width of the light incident surfaces (effective incident areas), is set larger than half of the width WL in the x direction of each of the small lenses in the first and second lens arrays 120 and 130 so as to be close to the size of light-source images (focal images) formed near the effective incident areas. Therefore, it is possible to cause some of the light, which is incident on the ineffective incident areas UA and is not available as in the related art, to enter the effective incident areas EA. This results in an increase in light utilization efficiency. In particular, the light intensity of light emitted from the light source 110 (FIG. 1) has a general tendency to be high near the optical axis of the light source and to rapidly decrease toward the periphery, and that the parallelism of light, namely, the light collecting ability, has a tendency to be lowest near the optical axis of the light source and to increase toward the periphery. Therefore, in order to increase the intensity of illumination light emitted from the illumination device by improving the light utilization efficiency, it is most effective to improve the utilizing efficiency of light near the system optical axis LC. Accordingly, the light utilization efficiency can be further improved by setting the width WP in the x direction of the polarization separating films 144 to be larger than the size in the x direction of a focal image formed near the system optical axis LC, of focal images of the light source 110 that are formed by being collected near the polarization separating films 144 by each of the small lenses in the first lens array 120.

FIGS. 5 and 6 demonstrate examples, and the present invention is not limited to these examples. That is, the optical axes of each of the small lenses that constitute the first lens array 120 may be adjusted according to the layout positions of the polarizing conversion elements 140a and 140b, and the width WP in the x direction of the polarization separating films 144 and the reflecting films 145.

Figure 7:
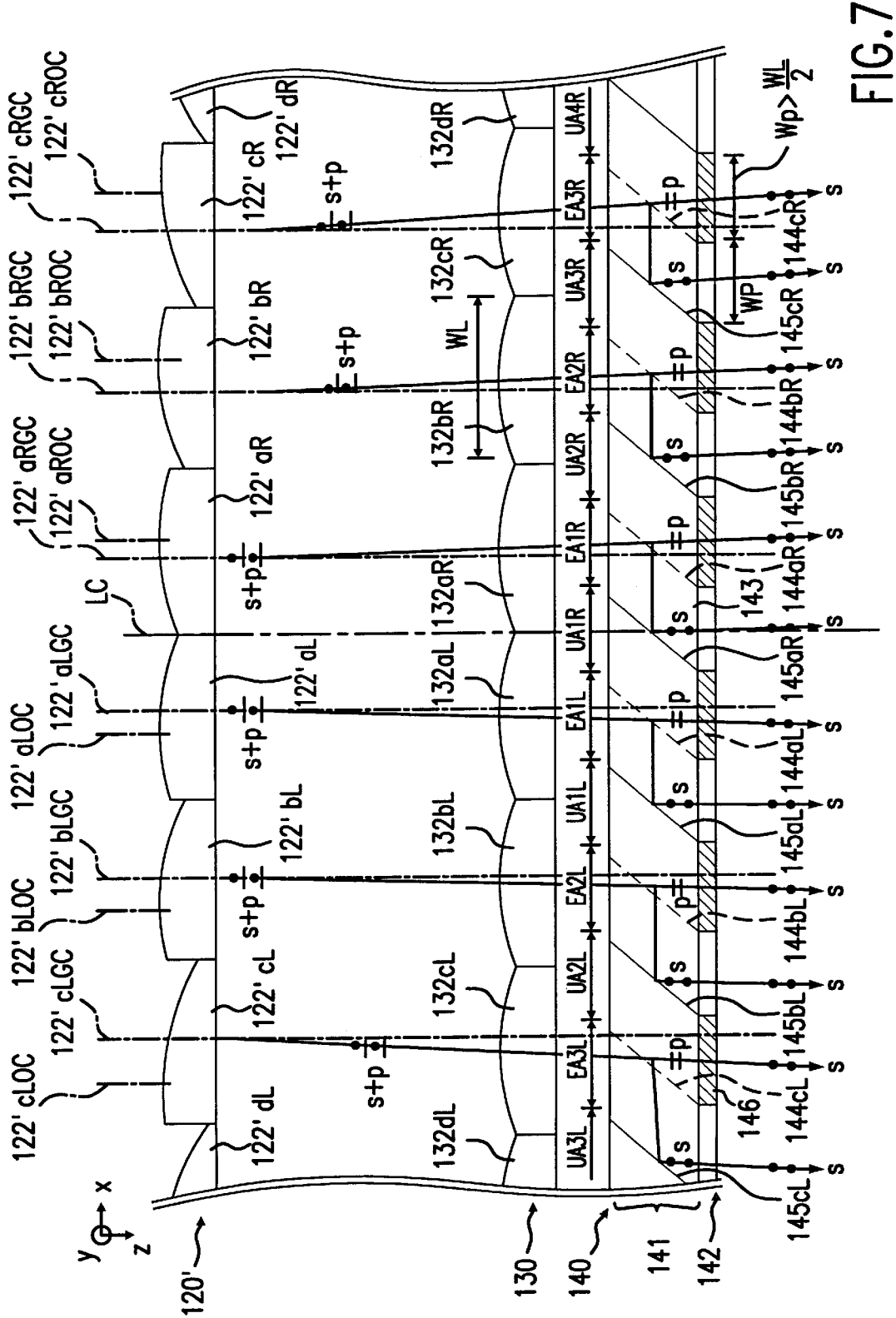
FIG. 7 is an enlarged explanatory view showing a first lens array 120', a second lens array 130, and a polarizing conversion element 140 that constitute a polarizing illumination device for use in a projection display device according to a second embodiment.
Figure 8A:
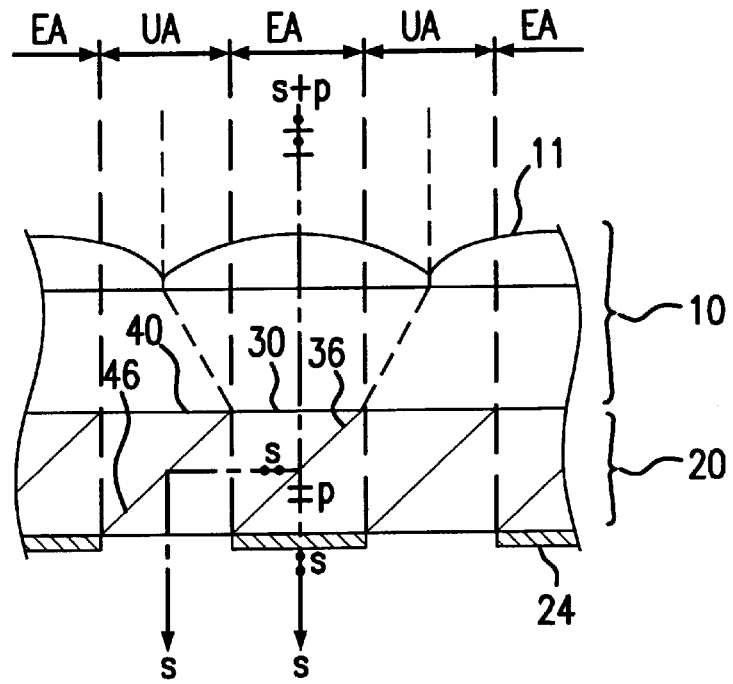
FIG. 8 is a plan view of an optical element for use in converting light polarized in random directions into light polarized in one direction.
Figure 8B:
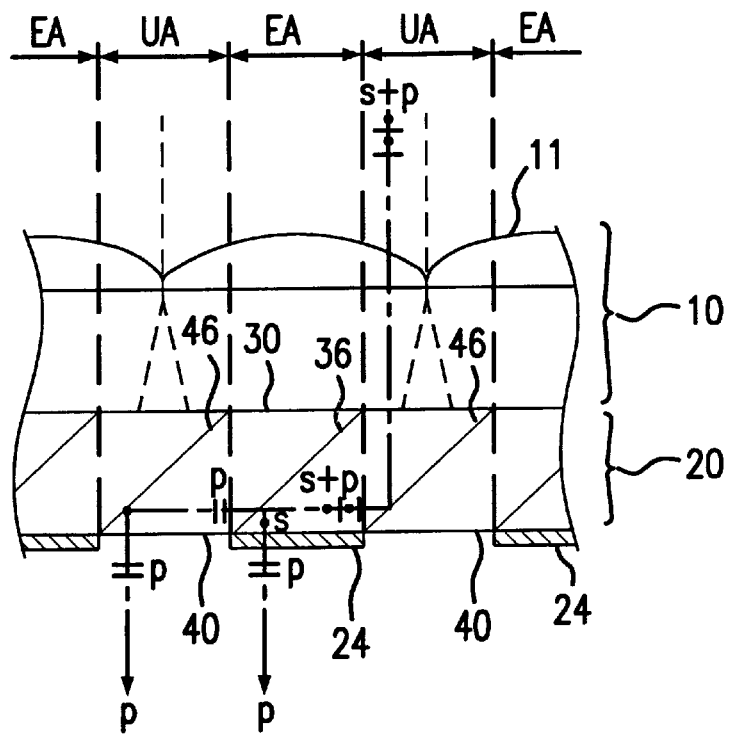

FIG. 7 is an enlarged explanatory view of a first lens array 120', a second lens array 130, and a polarizing conversion element 140 that constitute a polarizing illumination device for use in a projection display device according to a second embodiment. Other elements are the same as those in the first projection display device, and therefore, a description thereof is omitted.

While the two polarizing conversion elements 140a and 140b are closely and symmetrically positioned in such a manner as to point in opposite directions across the yz plane including the system optical axis LC in the first embodiment, a single polarizing conversion element 140 is used in the second embodiment. This polarizing conversion element 140 has similar functions to those of the polarizing conversion elements 140a and 140b in the first embodiment. The width of effective incident areas (light incident surface portions corresponding to polarization separating films 144) EA (EA1L to EA4L and EA1R to EA4R) of the polarizing conversion element 140 (the width in the x direction of the polarization separating films 144) and the width of ineffective incident areas (light incident surfaces corresponding to reflecting films 145) UA (UA1L to UA4L and UA1R to UA4R) (the width in the x direction of the reflecting films 145) are set to be larger than half of the width WL in the x direction of small lenses 132 (132aL to 132dL, 132aR to 132dR) of the second lens array 130, in a similar manner to the polarizing conversion elements 140a and 140b in the first embodiment.

The first lens array 120' and the second lens array 130 are placed so that the centers thereof align with the system optical axis LC. Each of the small lenses 122'aL to 122'dL and 122'aR to 122'dR in the first lens array 120' and each of the small lenses 132aL to 132dL and 132aR to 132dR in the second lens array 130 corresponding to the first lens array 120' are arranged so that the lens centers thereof align with each other.

The polarizing conversion element 140 is placed so that the center of the width in the x direction of the reflecting film 145aR corresponding to a partial beam emerging from the small lens 122'aR that is closest to the system optical axis LC (the width in the x direction of the ineffective incident area UA1R) aligns with the system optical axis LC.

The layout pitch in the x direction of the polarization separating films 144 is equal to the width WP in the x direction of the reflecting films 145. As mentioned above, the width Wp is larger than half of the width WL in the x direction of the small lenses 132 in the second lens array. Therefore, the positions of the incident surfaces of the polarization separating films 144aL to 144dL and 144aR to 144dR where each partial beam emerging from each of the small lenses 122'aL to 122'dL and 122'aR to 122'dR in the first lens array 120' should enter, namely, the positions of the effective incident areas EA1L to EA4L and EA1R to EA4R, are different in the x direction from the positions of the lens centers of 122'aLGC to 122'dLGC and 122'aRGC to 122'dRGC of each of the small lenses. In the second embodiment, similarly to the first embodiment, each of the small lenses 122'aL to 122'dL and 122'aR to 122'dR in the first lens array 120' are formed of decentering lenses, in which the positions of the optical axes 122'aLOC to 122'dLOC and 122'aROC to 122'dROC are adjusted, so that partial beams emerging from each of the small lenses 122'aL to 122'dL and 122'aR to 122'dR enter optimum positions in the effective incident areas EA1L to EA4L and EA1R to EA4R (the centers of the partial beams enter about the centers of the effective incident areas EA1L to EA4L and EA1R to EA4R).

Therefore, since the light, which is incident on the ineffective incident areas UA and is not available as in the related art, can also be caused to enter the effective incident areas EA in the second embodiment, the light utilization efficiency can be improved. In the second embodiment, the light utilization efficiency is lower than that of the first embodiment because the ineffective incident area UA2L exists near the system optical axis, whereas a single polarizing conversion element will do.

FIG. 7 demonstrates one example, and the present invention is not limited to this example. That is, in general, the optical axes of each of the small lenses that constitute the first lens array 120' may be adjusted according to the position of the polarizing conversion element 140, the size of the width WP in the x direction of the polarization separating films 144 and the reflecting films 145, and the like.

The present invention is not limited to the embodiments described above, and may be carried out by various modes without departing from the scope of the invention. For example, the following modifications may be made.

(1) While the polarization separating films and the reflecting films in the polarizing conversion element are alternately arranged in the x direction in the first and second embodiments, they may be arranged in the y direction. This also provides similar operations and advantages.

(2) The polarizing conversion elements 140a and 140b in the first embodiment are arranged so as to form a clearance across the system optical axis LC, as shown in FIG. 5. This arrangement is made in consideration of dimensional errors of the polarizing conversion elements 140a and 140b. If these dimensional errors are so small that they can be neglected, the polarizing conversion elements 140a and 140b may be closely arranged.

(3) The polarizing illumination device of the present invention may be applied not only to the projection display device shown in FIG. 1, but also to other various devices. For example, the polarizing illumination device of the present invention may be applied to a projection display device for projecting a monochrome image instead of a color image. In this case, a single liquid crystal light valve will do for the device shown in FIG. 1, and a colored-light separation means for separating a light beam into three colors, and a colored-light synthesizing means for synthesizing the three color beams may be omitted. Furthermore, the polarizing illumination device of the present invention may be applied to a projection color display device using only one light valve. While the transmissive projection display device has been described as an example in the above embodiments, the polarizing illumination device of the present invention may be applied to a reflective projection display device. The "transmissive" type means that an optical modulation means such as a liquid crystal light valve transmits light, and the "reflective" type means that the optical modulation means reflects light. In the reflective projection display device, a cross dichroic prism is used as a colored-light separation means for separating white light into light of three colors, red, green, and blue, and is also used as a colored-light synthesizing means for synthesizing again and emitting the modulated three colored lights in the same direction. Even when the present invention is applied to the reflective projection display device, it is possible to obtain almost the same advantages as those of the transmissive projection display device. The present invention may also be applied to a rear-type display device and the like.

What is claimed is:

1. A polarizing illumination device, comprising:

a light source;

a lens array having a plurality of small lenses arranged in a matrix along a first direction and along a second direction perpendicular to the first direction, the lens array separating light emitted from said light source into a plurality of partial beams; and a polarizing conversion element including a polarizing beam splitter array that separates each of said plurality of partial beams that have passed through said lens array into light components having first and second polarization directions, said polarizing beam splitter array separating the partial beams with a plurality of pairs of polarizing beam separation surfaces and reflecting surfaces, said reflecting surfaces being in parallel with said polarizing beam separation surfaces, said reflecting surfaces reflecting one of the light components having first and second polarization directions separated by said polarizing beam separation surfaces, said plurality of pairs of said polarizing beam separation surfaces and said reflecting surfaces being arranged along at least said first direction, and a phase plate that aligns the polarization directions of the light components emerging from said polarizing beam splitter array into one of the first and second polarization directions, the optical centers of said plurality of small lenses in said lens array being offset from geometrical centers of said plurality of small lenses so that the plurality of partial beams for at least one line arranged in said first direction, enter desired areas of said polarizing beam separation surfaces.

2. The polarizing illumination device of claim 1, the polarization separating surfaces of said small lenses having effective incident areas and ineffective incident areas, the desired areas being the effective incident areas.

3. The polarizing illumination device of claim 2, wherein light transmitted through the effective incident areas is converted into light having one of the first and the second polarization directions and light transmitted through the ineffective incident areas is converted into light having the other of the first and second polarization directions.

4. The polarizing illumination device according to claim 1, a layout pitch WP of said polarizing beam separation surfaces and said reflecting surfaces along said first direction in said polarizing beam splitter array is set to be larger than WL/2, where WL is a width in said first direction of one of said plurality of small lenses.

5. A polarizing illumination device, comprising:

a light source;

a lens array having a plurality of small lenses arranged in a matrix along a first direction and along a second direction perpendicular to the first direction, the lens array separating light emitted from said light source into a plurality of partial beams; and first and second polarizing conversion elements each including a polarizing beam splitter array that separates each of a plurality of partial beams passing through said lens array into light components having first and second polarization directions, said polarizing beam splitter array separating the partial beams with a plurality of pairs of polarizing beam separation surfaces and reflecting surfaces, said reflecting surfaces being in parallel with said polarizing beam separation surfaces, said reflecting surfaces reflecting one of light components having first and second polarization directions separated by said polarizing beam separation surfaces, said plurality of pairs of said polarizing beam separation surfaces and said reflecting surfaces being arranged along at least said first direction, and a phase plate that aligns the polarization directions of the light components emerging from said polarizing beam splitter array into one of the first and second polarization directions, said first and second polarization conversion elements being placed so that one of said polarizing beam separation surfaces of said first polarizing conversion element and one of said polarizing beam separation surfaces of said second polarization conversion element are closely opposed to each other across a center optical axis of said light source, and optical centers of said plurality of small lenses in said lens array being offset so that the plurality of partial beams for at least one line arranged in said first direction enter desired areas of said polarizing beam separation surfaces.

6. The polarizing illumination device of claim 5, the polarization separating surfaces of said small lenses having effective incident areas and ineffective incident areas, the desired areas being the effective incident areas.

7. The polarizing illumination device of claim 6, wherein light transmitted through the effective incident areas is converted into light having one of the first and the second polarization directions and light transmitted through the ineffective incident areas is converted into light having the other of the first and second polarization directions.

8. The polarizing illumination device according to claim 5, a layout pitch WP of said polarizing beam separation surfaces and said reflecting surfaces along said first direction in said polarizing beam splitter array is set to be larger than WL/2, where WL is a width in said first direction of one of said plurality of small lenses.

9. The polarizing illumination device according to claim 1, the optical center of a first one of said small lenses, which is disposed close to a center optical axis of said light source, is positioned offset from a geometric center of said first small lens toward the center optical axis of said light source, and a distance between the optical centers of two of the small lenses adjoining along said first direction is set to be larger than a pitch between the geometrical centers of said two small lenses.

10. The polarizing illumination device according to claim 5, the optical center of a first one of said small lenses, which is disposed close to a center optical axis of said light source, is positioned offset from a geometric center of said first small lens toward the center optical axis of said light source, and a distance between the optical centers of two of the small lenses adjoining along said first direction is set to be larger than a pitch between the geometrical centers of said two small lenses.

11. The polarizing illumination device according to claim 1, at least a part of said plurality of small lenses being formed of a decentering lens.

12. The polarizing illumination device according to claim 5, at least a part of said plurality of small lenses being formed of a decentering lens.

13. A projection display device, comprising:
a) a polarizing illumination device including:
   a light source;
   a lens array having a plurality of small lenses arranged in a matrix along a first direction and along a second direction perpendicular to the first direction, the lens array separating light emitted from said light source into a plurality of partial beams; and
   a polarizing conversion element including a polarizing beam splitter array that separates each of said plurality of partial beams that have passed through said lens array into light components having first and second polarization directions, said polarizing beam splitter array separating the partial beams with a plurality of pairs of polarizing beam separation surfaces and reflecting surfaces, said reflecting surfaces being in parallel with said polarizing beam separation surfaces, said reflecting surfaces reflecting one of the light components having first and second polarization directions separated by said polarizing beam separation surfaces, said plurality of pairs of said polarizing beam separation surfaces and said reflecting surfaces being arranged along at least said first direction, and a phase plate that aligns the polarization directions of the light components emerging from said polarizing beam splitter array into one of the first and second polarization directions,
   the optical centers of said plurality of small lenses in said lens array being offset from geometrical centers of said plurality of small lenses so that the plurality of partial beams for at least one line arranged in said first direction, enter desired areas of said polarizing beam separation surfaces;
b) a modulator that modulates emergent light from said polarizing illumination device according to a given image signal; and
c) a projection device that projects the light modulated by said modulator onto a projection plane.

14. A projection display device, comprising:
a) a polarizing illumination device including:
   a light source;
   a lens array having a plurality of small lenses arranged in a matrix along a first direction and along a second direction perpendicular to the first direction, the lens array separating light emitted from said light source into a plurality of partial beams; and
   first and second polarizing conversion elements each including a polarizing beam splitter array that separates each of a plurality of partial beams passing through said lens array into light components having first and second polarization directions, said polarizing beam splitter array separating the partial beams with a plurality of pairs of polarizing beam separation surfaces and reflecting surfaces, said reflecting surfaces being in parallel with said polarizing beam separation surfaces, said reflecting surfaces reflecting one of light components having first and second polarization directions separated by said polarizing beam separation surfaces, said plurality of pairs of said polarizing beam separation surfaces and said reflecting surfaces being arranged along at least said first direction, and a phase plate that aligns the polarization directions of the light components emerging from said polarizing beam splitter array into one of the first and second polarization directions,
   said first and second polarization conversion elements being placed so that one of said polarizing beam separation surfaces of said first polarizing conversion element and one of said polarizing beam separation surfaces of said second polarization conversion element are closely opposed to each other across a center optical axis of said light source, and
   optical centers of said plurality of small lenses in said lens array being offset so that the plurality of partial beams for at least one line arranged in said first direction enter desired areas of said polarizing beam separation surfaces;
b) a modulator that modulates emergent light from said polarizing illumination device according to a given image signal; and
c) a projection device that projects the light modulated by said modulator onto a projection plane.

15. A projection display device, comprising:
a) a polarizing illumination device including:
   a light source;
   a lens array having a plurality of small lenses arranged in a matrix along a first direction and along a second direction perpendicular to the first direction, the lens array separating light emitted from said light source into a plurality of partial beams; and
   a polarizing conversion element including a polarizing beam splitter array that separates each of said plurality of partial beams that have passed through said lens array into light components having first and second polarization directions, said polarizing beam splitter array separating the partial beams with a plurality of pairs of polarizing beam separation surfaces and reflecting surfaces, said reflecting surfaces being in parallel with said polarizing beam separation surfaces, said reflecting surfaces reflecting one of the light components having first and second polarization directions separated by said polarizing beam separation surfaces, said plurality of pairs of said polarizing beam separation surfaces and said reflecting surfaces being arranged along at least said first direction, and a phase plate that aligns the polarization directions of the light components emerging from said polarizing beam splitter array into one of the first and second polarization directions,
   the optical centers of said plurality of small lenses in said lens array being offset from geometrical centers of said plurality of small lenses so that the plurality of partial beams for at least one line arranged in said first direction, enter desired areas of said polarizing beam separation surfaces;
b) a colored-light separator that separates emergent light from said polarizing illumination device into lights of three colors;
c) three optical modulators that modulate said three colored lights according to a given image signal;
d) a colored-light synthesizer that synthesizes the modulated three colored lights modulated by said three optical modulators, and emits the synthesized lights in a same direction; and
e) a projection device that projects the lights synthesized by said colored-light synthesizing means onto a projection plane.

16. A projection display device, comprising:
a) a polarizing illumination device including:
   a light source;
   a lens array having a plurality of small lenses arranged in a matrix along a first direction and along a second direction perpendicular to the first direction, the lens array separating light emitted from said light source into a plurality of partial beams; and
   first and second polarizing conversion elements each including a polarizing beam splitter array that separates each of a plurality of partial beams passing through said lens array into light components having first and second polarization directions, said polarizing beam splitter array separating the partial beams with a plurality of pairs of polarizing beam separation surfaces and reflecting surfaces, said reflecting surfaces being in parallel with said polarizing beam separation surfaces, said reflecting surfaces reflecting one of light components having first and second polarization directions separated by said polarizing beam separation surfaces, said plurality of pairs of said polarizing beam separation surfaces and said reflecting surfaces being arranged along at least said first direction, and a phase plate that aligns the polarization directions of the light components emerging from said polarizing beam splitter array into one of the first and second polarization directions,
   said first and second polarization conversion elements being placed so that one of said polarizing beam separation surfaces of said first polarizing conversion element and one of said polarizing beam separation surfaces of said second polarization conversion element are closely opposed to each other across a center optical axis of said light source, and
   optical centers of said plurality of small lenses in said lens array being offset so that the plurality of partial beams for at least one line arranged in said first direction enter desired areas of said polarizing beam separation surfaces;
b) a colored-light separator that separates emergent light from said polarizing illumination device into lights of three colors;
c) three optical modulators that modulate said three colored lights according to a given image signal;
d) a colored-light synthesizer that synthesizes the modulated three colored lights modulated by said three optical modulators, and emits the synthesized lights in a same direction; and
e) a projection device that projects the lights synthesized by said colored-light synthesizing means onto a projection plane.

* * * * *